(12) United States Patent
Umar et al.

(10) Patent No.: US 9,700,865 B2
(45) Date of Patent: Jul. 11, 2017

(54) APPARATUSES AND METHODS FOR COOLING CATALYST

(71) Applicant: UOP LLC, Des Plaines, IL (US)

(72) Inventors: Syed Basheer Umar, Tamilnadu (IN); Ashim Mandal, Kolkata (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/485,563

(22) Filed: Sep. 12, 2014

(65) Prior Publication Data
US 2016/0074825 A1 Mar. 17, 2016

(51) Int. Cl.
| | | |
|---|---|---|
| *B01J 8/24* | (2006.01) | |
| *B01J 29/12* | (2006.01) | |
| *B01J 8/18* | (2006.01) | |
| *B01J 29/90* | (2006.01) | |
| *B01J 29/06* | (2006.01) | |
| *B01J 38/12* | (2006.01) | |
| *B01J 8/28* | (2006.01) | |

(52) U.S. Cl.
CPC .............. *B01J 8/1836* (2013.01); *B01J 8/24* (2013.01); *B01J 8/28* (2013.01); *B01J 29/06* (2013.01); *B01J 29/90* (2013.01); *B01J 38/12* (2013.01); *B01J 2208/00132* (2013.01); *B01J 2208/00256* (2013.01); *B01J 2208/00991* (2013.01)

(58) Field of Classification Search
CPC ..... B01J 8/24; B01J 29/06; B01J 29/90; B01J 38/12; B01J 38/32; B01J 8/1836; B01J 29/12; B01J 29/32

USPC ......................................................... 422/144
See application file for complete search history.

(56) References Cited

U.S. PATENT DOCUMENTS

| | | | | |
|---|---|---|---|---|
| 4,142,578 A | * | 3/1979 | Smith | F28F 9/22 165/134.1 |
| 4,605,636 A | * | 8/1986 | Walters | B01J 8/1836 208/113 |
| 4,958,680 A | * | 9/1990 | Barnes | C10G 11/182 165/104.16 |
| 7,439,414 B2 | | 10/2008 | Miller et al. | |
| 8,062,599 B2 | | 11/2011 | Miller | |
| 8,609,566 B2 | | 12/2013 | Palmas et al. | |

OTHER PUBLICATIONS

Dang et al., Erosion in FCCU Reactor and Regenerator System and Countermeasures, Petroleum Refinery Engineering, V 36, N 11, p. 27-29, Nov. 15, 2006; Language: Chinese; ISSN: 1002106X; Publisher: Editorial Office of P.R.E.

(Continued)

*Primary Examiner* — Walter D Griffin
*Assistant Examiner* — Huy-Tram Nguyen

(57) ABSTRACT

Apparatuses and methods for cooling catalyst are provided. In one embodiment, an apparatus for cooling catalyst includes a catalyst cooler vessel having a catalyst inlet for receiving catalyst. The apparatus includes a gas distributor lance positioned in the catalyst cooler vessel and having a gas outlet configured for injecting gas into the catalyst. The apparatus also includes a heat exchange tube positioned in the catalyst cooler vessel and having an outer surface. The heat exchange tube is configured to transfer heat from the catalyst to a heat exchange fluid. The apparatus further includes a hard surfacing material located on the outer surface of the heat exchange tube.

19 Claims, 2 Drawing Sheets

(56) References Cited

OTHER PUBLICATIONS

Zhang et al., Failure Analysis of Catalyst Cooler in Regenerator, Petroleum Refinery Engineering (ISSN 1002-106X) V29 N.1 27-29 (Jan. 25, 1999) (in Chinese with English Abstract), v 29, n 1, p. 27-29, Jan. 25, 1999; Language: Chinese; ISSN: 1002106X; Publisher: Gai Kan Bianjibu.

Anderson et al., Operations Adjustments Can Better Catalyst-Cooler Operations, Oil & Gas Journal (ISSN: 0030-1388) V97 N.16 53-56 (Apr. 19, 1999), v 97, n 16, p. 53-56, Apr. 19, 1999; ISSN: 00301388; Publisher: PennWell.

Johnson, Improve Regenerator Heat Removal, Hydrocarbon Processing International Edition (ISSN 0018-8190) V70 N.11 55-57 (Nov. 1991), v 70, n 11, p. 55-57, Nov. 1991; ISSN: 00188190; Publisher: Gulf Publishing Co.

* cited by examiner

APPARATUSES AND METHODS FOR COOLING CATALYST

TECHNICAL FIELD

The present disclosure generally relates to apparatuses and methods for cooling catalyst, and more particularly relates to apparatuses and methods for cooling catalyst with a heat exchange tube protected with a hard surfacing material.

BACKGROUND

The fluid catalyst cracking process (hereinafter FCC) has been extensively relied upon for the conversion of starting materials, such as vacuum gas oils and other relatively heavy oils, into lighter and more valuable products. In an FCC reaction zone, the starting material, whether it be vacuum gas oil or another oil, is contacted with a finely particulated, solid catalytic material that behaves as a fluid when mixed with a gas or vapor. This catalytic material possesses the ability to catalyze the cracking reaction. During the cracking reaction, coke is deposited on the surface of the catalyst as a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Typically, coke-contaminated catalyst enters the regenerator and is contacted with an oxygen containing gas at conditions such that the coke is oxidized and a considerable amount of heat is released. A portion of this heat escapes the regenerator with the flue gas, comprised of excess regeneration gas and the gaseous products of coke oxidation. The balance of the heat leaves the regenerator with the regenerated, or relatively coke free, catalyst. The high heat evolved in the regeneration process creates high temperatures in the regenerator. In order to withstand the high temperatures, the large regeneration vessel has an internal concrete-like refractory lining that insulates the metal shell from the high regenerator temperatures and erosion of the abrasive catalyst.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is referred to as being "spent", that is partially deactivated by the deposition of coke upon the catalyst. Catalyst from which coke has been substantially removed is referred to as "regenerated catalyst".

The rate of conversion of the feedstock within the reaction zone is controlled by regulation of the temperature, activity of catalyst and quantity of catalyst therein, as measured by catalyst to oil ratio. The most common method of regulating the reaction temperature is by regulating the rate of circulation of catalyst from the regeneration zone to the reaction zone, which simultaneously regulates the catalyst/oil ratio. That is to say, if it is desired to increase the conversion rate, an increase in the rate of flow of circulating fluid catalyst from the regenerator to the reactor is effected. Inasmuch as the temperature within the regeneration zone under normal operations is considerably higher than the temperature within the reaction zone, this increase in influx of catalyst from the hotter regeneration zone to the cooler reaction zone effects an increase in reaction zone temperature.

An increasing number of FCC units are processing heavier feedstocks that produce more coke, which results in excessive combustion temperature that may exceed the metallurgical limits of the vessel and in high catalyst temperature that reduces the catalyst circulation rate to the reaction section and thus limits operational flexibility. The term external catalyst cooler generally refers to a shell and tube heat exchanger that circulates catalyst from the regenerator on the shell side of the exchanger and saturated steam or water on the tube side of the exchanger. Gas nozzles or aeration piping keeps the catalyst in fluidized state so that the fluidized catalyst heat exchange indirectly with the water or steam and results colder catalyst that circulates through the cooler and provides a source of relatively lower temperature catalyst for recirculation to the regenerator or return to the FCC reaction zone. By lowering the temperature of the catalyst, independent of the coke combustion, the cooler allows the FCC unit to fully or partially combust coke without excessive temperatures or to control the catalyst circulation rate independent of the riser temperature.

Locating the heat exchanger tubes outside of the regenerator in an external cooler permits isolation from a majority of the catalyst inventory in the event of a tube rupture or other operational problems. The external location of the cooler relative to the regenerator requires a circulation of catalyst between the cooler and the regenerator. Normally the circulating catalyst enters or exits the cooler from a large open volume of the regenerator. Gas nozzles or aeration piping keep the catalyst in a fluidized state so that it can circulate through the cooler. The cooler can operate in a flow through mode where hot catalyst enters one end of the cooler and leaves through from an opposite end of the cooler or in a backmix mode where the catalyst enters and leaves through the opening without any net flow. Gas injection into the catalyst is not only useful to provide the necessary interchange of catalyst through the cooler but also provides the flexibility to vary the heat transfer rate between catalyst and water.

Accordingly, it is desirable to provide apparatuses and methods for cooling catalyst. In addition, it is desirable to provided apparatuses and methods for cooling catalyst with a heat exchange tube protected with a hard surfacing material to prevent impingement thereof. Furthermore, other desirable features and characteristics will become apparent from the subsequent detailed description and the appended claims, taken in conjunction with the accompanying drawings and this background.

BRIEF SUMMARY

Apparatuses and methods for cooling catalyst are provided. In an exemplary embodiment, an apparatus for cooling catalyst includes a catalyst cooler vessel having a catalyst inlet for receiving catalyst. The apparatus includes a gas distributor lance positioned in the catalyst cooler vessel and having a gas outlet configured for injecting gas into the catalyst. The apparatus also includes a heat exchange tube positioned in the catalyst cooler vessel and having an outer surface. The heat exchange tube is configured to transfer heat from the catalyst to a heat exchange fluid. The apparatus further includes a hard surfacing material located on the outer surface of the heat exchange tube.

In accordance with another exemplary embodiment, an apparatus for processing catalyst is provided. The apparatus includes a regeneration vessel configured to receive spent catalyst and to regenerate the spent catalyst to form regenerated catalyst. The apparatus further includes a catalyst cooler in fluid communication with the regeneration vessel for receiving the catalyst therefrom. The catalyst cooler includes a heat exchange tube having an outer surface and a hard surfacing material located on the outer surface of the heat exchange tube.

In accordance with a further exemplary embodiment, a method for cooling catalyst is provided. The method includes delivering the catalyst into a catalyst cooler vessel and transferring heat from the catalyst to a heat exchange tube positioned in the catalyst cooler vessel. The heat exchange tube has an outer surface. The method includes injecting gas into the catalyst within the catalyst cooler vessel to cause back-mixing of the catalyst. Further, the method includes preventing impingement of the outer surface of the heat exchange tube by the gas with a hard surfacing material located on the outer surface of the heat exchange tube.

BRIEF DESCRIPTION OF THE DRAWINGS

Various embodiments will hereinafter be described in conjunction with the following drawing figures, wherein like numerals denote like elements, and wherein.

DETAILED DESCRIPTION

The following detailed description is merely exemplary in nature and is not intended to limit the application and uses of the embodiment described. Furthermore, there is no intention to be bound by any theory presented in the preceding background or the following detailed description.

The various embodiments described herein relate to apparatuses and methods for cooling catalyst. Specifically, embodiments described herein are provided to transfer hot catalyst from a regenerator vessel to an external catalyst cooler where the catalyst is cooled before being returned to the regenerator vessel. The catalyst is cooled by contact with heat exchange tubes. To provide sufficient movement of the catalyst, gas is injected into the catalyst in the catalyst cooler. However it has been found that the gas injection leads to operational issues like loss of heat transfer or heat transfer tube rupture . . . . For example, the injection orifices through which the gas flows may become partially plugged, or the gas flow path may become mechanically altered, such as by bending. As a result, the gas may be injected into the catalyst cooler at a rate higher than desired. High injection flow rates may, over time, erode nearby heat transfer tubes. Therefore, embodiments herein provide a hard surfacing material on the heat transfer tubes. Specifically, the outer surface area of the heat transfer tubes near the injection orifices are covered with the hard surfacing material. As a result, the injection flow rate of the gas may vary, or may be increased, without eroding the heat transfer tubes.

Figure 1:
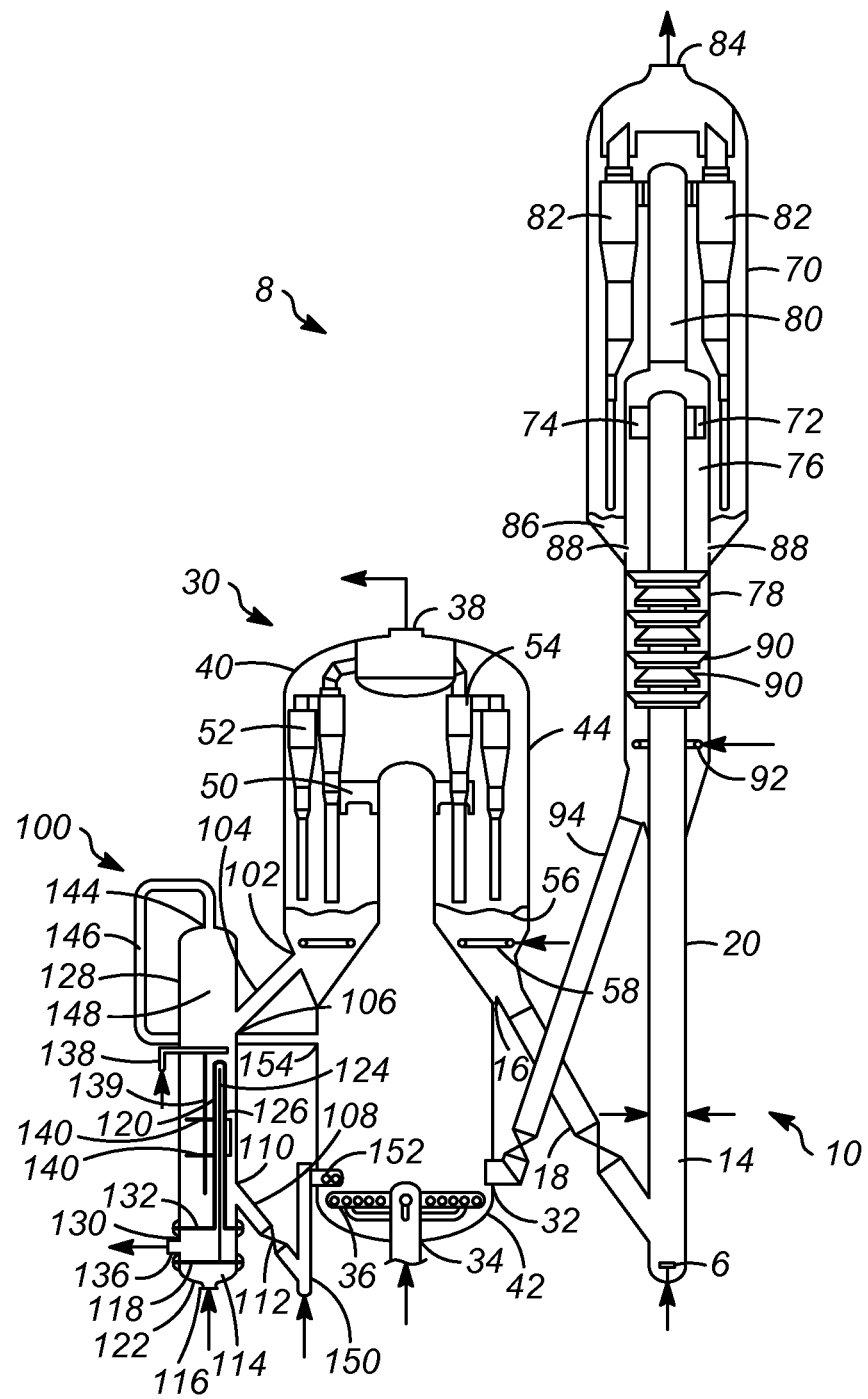
FIG. 1 is a schematic diagram of an FCC reactor and regenerator with an external catalyst cooler.

Embodiments of the apparatuses and methods for cooling catalyst can be applied to any FCC unit that uses a catalyst cooler and distributes fluidizing gas to the catalyst cooler. An exemplary FCC unit 8 is shown in FIG. 1. While exemplary structures and processes are described below in relation to the FCC unit 8 of FIG. 1, such structures and processes are described for background to the apparatuses and methods of FIG. 2, which is not limited to the embodiment of FIG. 1. In the FCC unit 8 of FIG. 1, hydrocarbon feedstock may be sprayed by distributors 10 into a reactor vessel or riser 20 where it contacts catalyst. In general, feedstock may be cracked in the riser 20 in the presence of catalyst to form a cracked product stream.

A conventional FCC feedstock is a suitable feed to the riser 20. The most common of such conventional feedstocks is a "vacuum gas oil" (VGO), which is typically a hydrocarbon material having a boiling range with an IBP of no more than about 340° C. (644° F.), a T5 boiling point (the temperature at which 5 vol-% of the stream will boil) of from about 340° C. (644° F.) to about 350° C. (662° F.), a T95 boiling point (the temperature at which 95 vol-% of the stream will boil) of from about 555° C. (1031° F.) to about 570° C. (1058° F.) and an EP (end point) of no less than about 570° C. (1058° F.) prepared by vacuum fractionation of atmospheric residue. Such a fraction is generally low in coke precursors and heavy metal contamination which can serve to contaminate catalyst. Atmospheric residue is a another suitable feedstock boiling with an IBP (initial boiling point) of no more than about 340° C. (644° F.), a T5 boiling point of from about 340° C. (644° F.) to about 360° C. (680° F.), a T95 boiling point of from about 700° C. (1292° F.) to about 900° C. (1652° F.), and an EP of no less than about 900° C. (1652° F.) obtained from the bottom of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction, vacuum reduced crudes. Fresh hydrocarbon feedstocks also include mixtures of the above hydrocarbons and the foregoing list is not comprehensive. FCC feedstock may be vaporized and sprayed in the riser by the distributors 10.

As shown in FIG. 1, regenerated catalyst is delivered to the riser 20 from regenerator standpipe 18. In an embodiment, lift gas that may include inert gas such as steam may be distributed by lift gas distributor 6 to lift catalyst upwardly from a lower section 14 of the riser 20. Feed sprayed from a distributor 10 contacts lifted, fluidized catalyst and moves upwardly in the riser 20 as the hydrocarbon feed cracks to smaller hydrocarbon cracked products. The cracked products and spent catalyst enter the reactor vessel 70 and are then discharged from the top of the riser 20 through the riser outlet 72 and separated into a cracked product vapor stream and a collection of catalyst particles covered with substantial quantities of coke and generally referred to as spent catalyst. A swirl arm arrangement 74, provided at the end of the riser 20, may further enhance initial catalyst and cracked hydrocarbon separation by imparting a tangential velocity to the exiting catalyst and cracked product vapor stream mixture. The swirl arm arrangement 74 is located in an upper portion of a separation chamber 76, and a stripping zone 78 is situated in the lower portion of the separation chamber 76. Catalyst separated by the swirl arm arrangement 74 drops down into the stripping zone 78.

The cracked product vapor stream including cracked hydrocarbons such as naphtha and light olefins, as well as some catalyst may exit the separation chamber 76 via a gas conduit 80 in communication with cyclones 82. The cyclones 82 may remove remaining catalyst particles from the product vapor stream to reduce particle concentrations to very low levels. The product vapor stream may exit the top of the reactor vessel 70 through a product outlet 84. Catalyst separated by the cyclones 82 returns to the reactor vessel 70 through diplegs into a dense bed 86 where catalyst will pass through chamber openings 88 and enter the stripping zone 78. The stripping zone 78 removes adsorbed and entrained hydrocarbons from the catalyst by counter-current contact with inert gas such as steam over the optional baffles 90. Steam may enter the stripping zone 78 through a distributor 92. A spent catalyst conduit 94 transfers coked catalyst, regulated by a control valve, to a catalyst regenerator 30. Additionally, a spent catalyst recycle conduit (not shown) may transfer some spent catalyst back to the riser 20 below the feed distributor arrangement 10 without undergoing regeneration.

As shown in FIG. 1, the catalyst regenerator 30 receives the coked catalyst through an inlet 32 and typically combusts the coke from the surface of the catalyst particles by contact with an oxygen-containing gas. The oxygen-containing combustion gas enters the bottom of the regenerator 30 via an inlet 34 to a combustion gas distributor 36. Flue gas and entrained catalyst pass upwardly through the regenerator 30. Flue gas exits the regenerator 30 through a flue gas outlet 38.

The catalyst regenerator 30 comprises a regenerator vessel 40 comprising a lower chamber 42 and an upper chamber 44. The catalyst regenerator may be a two-stage regenerator in which air is delivered to the upper, first-stage chamber 44 and the lower, second-stage chamber 42. In a two-stage regenerator, the spent catalyst is first delivered to the first-stage chamber 44, called first stage regenerator to achieve partial combustion. The partially regenerated catalyst is then passed downwardly to the second-stage chamber 42, called second stage regenerator for complete combustion of the coke. About 20 to about 40 wt % of the air is delivered to the lower chamber for complete combustion. The flue gas from the lower chamber which has small amount of excess air and the balance of total air are delivered to the upper chamber to achieve partial combustion.

The catalyst regenerator 30 may also comprise a combustor regenerator as shown in FIG. 1. In a combustor regenerator, spent catalyst enters the lower chamber 42, called the combustion chamber, in which coke is combusted from the catalyst and catalyst and flue gas are transported from the lower chamber 42 to the upper chamber 44, called the disengaging chamber. A primary separator, called a combustor arm disengager or tee disengager 50, initially separates catalyst from flue gas. Regenerator cyclones 52, 54, or other means, remove entrained catalyst particles from the rising flue gas before the flue gas exits the vessel through the flue gas outlet 38. Combustion of coke from the catalyst particles raises the temperature of the catalyst. Disengaged catalyst collects in a dense bed 56 that is fluidized by air from distributor 58. Disengaged catalyst may exit from the regenerator vessel through a regenerated catalyst outlet 16 to a regenerator standpipe 18. The catalyst may pass, regulated by a control valve, through the regenerator standpipe 18 to the lower section 14 of the riser 20.

Regenerated catalyst from the regenerator standpipe 18 will usually have a temperature in a range from about 649° C. to about 760° C. during normal operation. The dry air rate to the regenerator may be from about 8 to about 15 kg/kg coke, the lower range will be possible for partial burn units with oxygen containing gas. The hydrogen in coke may be from about 4 to about 8 wt %, and the sulfur in coke may be from about 0.6 to about 3.0 wt %.

At least one catalyst cooler 100 is provided to cool regenerated catalyst. In the combustor regenerator 30, catalyst is transferred from the upper chamber 44 through a cooler catalyst outlet 102 through a hot catalyst conduit 104 to the catalyst cooler 100 through a hot catalyst inlet 106. The cooler catalyst outlet 102 is provided in the upper chamber 44, so hot catalyst is withdrawn from the upper chamber 44 for transport to the hot catalyst inlet 106. More than one catalyst cooler may be used although only one is shown in FIG. 1.

Catalyst cooler 100 shown in FIG. 1 is a flow-through type cooler. Catalyst heat exchange tubes 120 are located in catalyst cooler 100 and cool the catalyst before it is withdrawn from the catalyst cooler 100 through the cooler catalyst outlet 110 to a cooled catalyst pipe 108. The use of heat exchange tubes 120 allows the partial recovery and removal of heat from the catalyst caused by combustion of coke in the regenerator vessel 40. In an exemplary embodiment, there are from about 50 to about 300 heat exchange tubes 120 located in the catalyst cooler 100, such as from about 75 to about 200 heat exchange tubes 120. Heat removed from the catalyst is typically used to produce steam that can be used elsewhere in the refinery. Catalyst control valve 112 regulates the amount of catalyst exiting cooled catalyst exit 110 through cooled catalyst pipe 108 and thus entering the catalyst cooler 100 from the regenerator vessel 40 and thereby controls the temperature in regenerator vessel 40.

Regenerated catalyst entering catalyst cooler 100 through hot catalyst inlet 106 contacts catalyst heat exchange tubes 120. Catalyst drifts downwardly through catalyst cooler 100 into a lower portion of the cooler and exits through cooler catalyst outlet 110 below said hot catalyst inlet 106.

Catalyst cooler 100 is typically "cold-walled". The term "cold-walled" means that the metal shell 128 of the cooler 100 is coated with an inner insulative refractory lining. In such cases, the shell 128 of the cooler 100 is made of carbon steel. However, in an embodiment, the shell 128 may be without an insulative refractory lining, which is considered "hot-walled." Additionally, parts of the cooler 100 may be additionally lined with an abrasion resistant coating. The shell 128 of the cooler 100 may be made of stainless steel.

The catalyst cooler 100 includes an inlet manifold 114 and an outlet manifold 130. A lower tube sheet 118 may be bolted between a flange at the upper end of a lower head 122 of cooler 100 and a lower flange at a lower end of the outlet manifold 130. Upper tube sheet 132 may be bolted between a flange at the upper end of the outlet manifold 130 and a lower end of the shell 128 that defines the cooler 100. Bracing supports 140 extend horizontally in the catalyst cooler 100 to stiffen the bundle of heat exchange tubes 120 vertically aligned in catalyst cooler 100. Supports 140 may define openings through which heat exchange tubes extend. There may be at least two layers of supports 140 in each catalyst cooler 100. Supports may be secured to the heat exchange tubes 120 and to each other by vertical support rods that may be made of the same material as the heat exchange tubes 120. The supports 140 and the heat exchange tubes 120 are enabled to thermally expand together as necessary without binding.

In an embodiment, boiler feed water is the heat exchange fluid, but other types of heat exchange fluid are contemplated including water with additives to affect the boiling point of the fluid. Boiler feed water enters the inlet manifold 114 through cooling medium nozzle 116 at or near the bottom of catalyst cooler 100. In an embodiment, the inlet manifold 114 is defined between the lower tube sheet 118 and the lower head 122 of the cooler 100. Exemplary catalyst heat exchange tubes 120 have an inlet and an outlet at or near the bottom of the cooler 100. Exemplary catalyst heat exchange tubes 120 are bayonet-style tubes that each include an inner tube 124 and an outer tube 126. The inner tube 124 extends into and through a majority length of the outer tube 126. An exemplary inner tube 124 has an outer diameter of from about 25 millimeters (mm) to about 50 mm, such as about 30 mm to about 40 mm. An exemplary outer tube 126 has an outer diameter of about 50 mm to about 100 mm, such as about 70 mm to about 80 mm. The inner tube 124 of heat exchange tube 120 is secured to, extends through and projects from the lower tube sheet 118. Inlets of inner tubes 124 fluidly communicate with inlet manifold 114. Boiler feed water entering inlet manifold 114 is directed up inner tube 124 of heat exchange tube 120. Boiler feed water travels up the length of the inner tube 124 and exits outlets of inner tubes 124. The boiler feed water then reverses direction and flows down the outer tube 126 that surrounds inner tube 124. The catalyst contacts an outer surface of outer tube 126 of catalyst heat exchange tubes 120.

Heat from the catalyst is indirectly exchanged with boiler feed water in outer tubes 126. The indirect heat exchange raises the temperature of the boiler feed water in outer tubes 126 and converts at least a portion of it to steam. This contact with outer tubes 126 lowers the temperature of the catalyst descending in the catalyst cooler 100. The heated boiler feed water and steam from outer tubes 126 are directed out of outlets of outer tubes 126 and into outlet manifold 130 defined between upper tube sheet 132 and the lower tube sheet 118 in the catalyst cooler 100. Outer tubes 126 are secured to, extend through and project from upper tube sheet 132. Outlets of outer tubes 126 fluidly communicate with outlet manifold 130. Fluid in outlet manifold 130 is then transported out of catalyst cooler 100 through nozzle 136 into a circulation drum where the vapor and heated boiler feed liquid are separated. The cooled catalyst then travels out of the catalyst cooler 100 through the cooler catalyst outlet 110 into the cooled catalyst pipe 108 that communicates the catalyst cooler 100 with the regenerator vessel 40 through the catalyst recirculation valve 112. In an aspect, the cooled catalyst pipe 108 communicates with a riser 150. Fluidizing gas is fed to the riser 150 to lift and deliver cooled catalyst from the riser 150 into the regenerator vessel 40, such as into the lower chamber 42 of the regenerator 30. A catalyst distributor 152 may distribute catalyst through openings into the regenerator vessel 40.

A fluidizing gas is also directed downwardly in catalyst cooler 100 by a distributor 138 with a lance 139. While a single lance 139 is illustrated for clarity, in an exemplary embodiment the distributor 138 is in fluid communication with a plurality of lances 139. The exemplary distributor 138 is located above heat exchange tubes 120 with the lance 139 directing the fluidizing gas downwardly in catalyst cooler 100. A gas such as air is used to fluidize the catalyst particles entering catalyst cooler 100 through hot catalyst inlet 106. The flow rate of the fluidizing gas should be sufficiently high to accomplish fluidization of the catalyst. The fluidizing gas used in catalyst cooler 100 improves the heat transfer between catalyst and heat exchange tubes 120 by generating turbulence that enhances the heat transfer coefficient between the catalyst and the heat exchange tubes 120. The two ways to control the temperature of the circulated catalyst are to either control the amount of catalyst flowing through catalyst cooler 100 by the catalyst recirculation valve 112 or to vary the fluidizing gas rate distributed to catalyst cooler 100 through distributor 138.

A top of the catalyst cooler 100 is provided with a vent 144 for allowing fluidizing gas to exit the catalyst cooler. A vent pipe 146 communicates the vent 144 with the regenerator vessel 40 through a vent gas inlet 154. In the illustrated embodiment, the vent pipe 146 communicates with the lower chamber 42 of the regenerator vessel 40. Alternatively, the vent pipe 146 may communicate with the upper chamber 44. As shown, air is vented to the lower chamber 42 separately from the cooled catalyst exiting in cooled catalyst pipe 108 and hot catalyst entering through hot catalyst inlet 106. Consequently, air exiting the catalyst cooler travels to the lower chamber 42 of the regenerator where it can be consumed in the combustion of coke from spent catalyst therein.

A disengaging portion 148 may be disposed in the catalyst cooler 100 between the hot catalyst inlet 106 and the vent 144 above the gas distributor 138. The disengaging portion 148 provides a space in which catalyst may disengage from fluidizing gas before exiting the vent 144. The heat exchange tubes 120 are below the disengaging portion 148. In an aspect, the vent 144 is spaced above the hot catalyst inlet 106 to provide the disengaging portion 148.

The heat exchange tubes may be made of a chromium-molybdenum-iron alloy. Such alloys are resistant to corrosion from trace chlorides in the boiler feed water if used as the heat exchange liquid.

The zeolitic molecular sieves used in typical FCC operation have a large average pore size. Molecular sieves with a large pore size have pores with openings of greater than about 0.7 nm in effective diameter defined by greater than 10 and typically 12 membered rings. Suitable large pore molecular sieves include synthetic zeolites such as X-type and Y-type zeolites, mordenite and faujasite. Exemplary molecule sieves are Y-type zeolites with low rare earth content. Low rare earth content denotes less than or equal to about 1.0 wt % rare earth oxide on the zeolitic portion of the catalyst. Catalyst additives may be added to the catalyst composition during operation. Medium pore sized molecular sieves such as MFI with openings of about 0.7 nm or less may be blended in with the large pore molecular sieves to increase production of lighter olefins. In some cases, only medium pore sized molecular sieves may be used if the feed to the riser is an FCC product cut such as a naphtha stream.

The riser 20 may operate with a catalyst-to-oil ratio of from about 4 to about 12, such as from about 4 to about 10. Inert gas to the riser 20 may be from about 1 to about 15 wt % of hydrocarbon feed, such as from about 4 to about 12 wt %. Before contacting the catalyst, the hydrocarbon feed may have a temperature of from about 149° C. to about 427° C., such as from about 204° C. to about 288° C. The riser 20 may operate at a temperature of from about 427° C. to about 649° C., such as from about 482° C. to about 593° C. The pressure in the riser 20 may be from about 69 to about 241 kPa (gauge), such as from about 90 to about 110 kPa (gauge).

Figure 2:
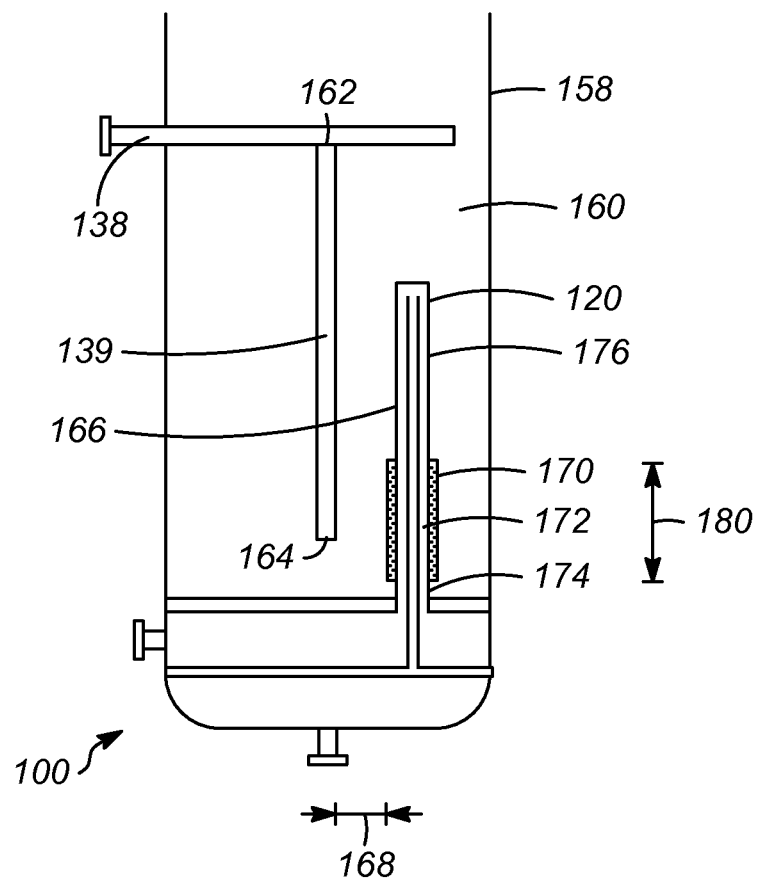
FIG. 2 is a schematic diagram of an exemplary embodiment of an apparatus for cooling catalyst as applied to the external catalyst cooler of FIG. 1.

The catalyst cooler 100 is illustrated with more detail related to embodiments described herein with regard to FIG. 2. As shown, the catalyst cooler 100 includes a vessel including a vessel wall 158 bounding a vessel chamber 160. The distributor 138 passes through the vessel wall 158 and into the vessel chamber 160. The lance 139 is wholly positioned within the vessel chamber 160 and descends in a substantially vertical direction from the distributor 138 to a distal end 164. An exemplary lance 139 is made of stainless steel. While only one lance 139 is illustrated for purposes of clarity, in an exemplary embodiment, there are from about 50 to about 300 lances 139 located in the catalyst cooler 100, such as from about 75 to about 200 lances 139. Each lance 139 includes a restriction orifice 162 near a proximal end of the lance 139. The orifice 162 may be sized so as to create backpressure and constant critical flow downstream of restriction orifice 162.

As shown, the lance 139 is substantially parallel to the heat exchange tube 120. In an exemplary embodiment, the lance 139 is separated from an outer surface 166 of the heat exchange tube 120 by a distance 168 of from about 50 mm to about 200 mm, such as from about 80 mm to about 120 mm. The distal end 164 of the lance 139 forms a gas outlet and a fluidizing gas, such as air, is injected through the gas outlet of the distal end 164 of the lance 139 and into the catalyst in the vessel chamber 160. As the fluidizing gas moves upward from the distal end 164 of the lance 139, the fluidizing gas improves heat transfer from the catalyst to the heat exchange tube 120 by creating turbulence and mixing in near the outer surface 166 of the heat exchange tube 120. In an exemplary embodiment, the superficial velocity of the fluidizing gas is from about 0.1 feet per second (fps) to about 1.5 fps, such as from about 0.8 fps to about 1.2 fps.

To avoid impingement of the outer surface 166 of the heat exchange tube 120 by the fluidizing gas, or by catalyst moved by the fluidizing gas, a hard surfacing material 170 is provided on the outer surface 166 of the heat exchange tube 120. In an exemplary embodiment, the hard surfacing material 170 surrounds the heat exchange tube 120 and forms a substantially cylindrical sleeve. An exemplary hard surfacing material 170 covers a portion 172 of the heat exchange tube 120 nearest the gas outlet of the distal end 164 of the lance 139, e.g. at the same vertical elevation at the gas outlet of the distal end 164 of the lance 139. As shown, the heat exchange tube 120 may include a proximal portion 174 below the covered or protected portion 172, as well as a distal portion 176 above the covered portion 172. As shown, the proximal portion 174 and the distal portion 176 are not covered by the hard surfacing material 170, and are in contact with the catalyst.

An exemplary hard surfacing material 170 has a thickness of from about 1 millimeter (mm) to about 5 mm, such as about 2 mm to about 4 mm. Further, the exemplary hard surfacing material has a length 180 of from about 200 mm to about 500 mm, such as from about 300 mm to about 400 mm.

In an exemplary embodiment, the hard surfacing material 170 is a cobalt-chromium alloy and may include tungsten or molybdenum, manganese, nickel, iron, silicon and/or carbon. Other suitable material may include stainless steel alloys, chrome carbides or other alloys.

In an exemplary embodiment, the hard surfacing material 170 is deposited into the outer surface 166 of the heat transfer tube 120 by welding using electrodes. The hard surfacing material may be iron-based or cobalt-based. Iron-based hard surfacing material may be applied by shielded metal arc and conform to AWS (American Welding Society) A5.13:2000 or ASME (American Society of Mechanical Engineers) SFA 5.13 classification EFeCr-A1A. Iron-based hard surfacing material may be applied using bare electrodes conforming to AWS A5.21:2001 or ASME SFA 5.21 classification ERFeCr-A1A or ERCFeCr-A1A. Cobalt-based hard surfacing material may be applied by shielded metal arc conforming to AWS A5.13:2000, or ASME SFA 5.13 classification ECoCr-A or ECoCr-C. Cobalt-based hard surfacing material may be applied using bare electrodes conforming to AWS A5.21:2001 or ASME SFA 5.21 classification ERCoCr-A or ERCoCr-C, or ERCCoCr-A or ERCCoCr-C.

During a regeneration process, catalyst flows into the catalyst cooler 100 and gas is injected through the restriction orifice 162 and lance 139 to promote heat transfer. The gas exits from the distal end of 162 of lance 139 projected downwards in jet patterns. Any bend or distortion or partially plugging of lance 139 may result the in the jet impinging on the outer surface 166 of heat transfer tube 120. Hence the embodiments described herein prevent impingement of the outer surface 166 of the heat exchange tube 120 by the gas with a hard surfacing material 170 located on the outer surface 166 of the heat exchange tube 120.

Apparatuses and methods for cooling catalyst have been provided herein. The embodiments described include a catalyst cooler with a heat exchange tube having an outer surface covered with a hard surfacing material. The exemplary apparatus injects gas into the catalyst cooler near the hard surfacing material of the heat exchange tube. Due to the hard surfacing material, the flow rate of the injected gas need not be limited to avoid eroding the outer surface of the heat exchange tube. As a result, erosion and failure of heat exchange tubes in the catalyst cooler is decreased.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. An apparatus for cooling catalyst, the apparatus comprising:
   a catalyst cooler vessel having a catalyst inlet for receiving the catalyst;
   a gas distributor lance positioned in the catalyst cooler vessel and having a gas outlet configured for injecting gas into the catalyst;
   a heat exchange tube positioned in the catalyst cooler vessel and having an outer surface, the heat exchange tube being configured to transfer heat from the catalyst to a heat exchange fluid; and
   a hard surfacing material located on and welded to the outer surface of the heat exchange tube.

2. The apparatus of claim 1 wherein the hard surfacing material is located on the outer surface of the heat exchange tube adjacent the gas outlet of the gas distributor lance.

3. The apparatus of claim 1 wherein the hard surfacing material surrounds the outer surface of the heat exchange tube to form a substantially cylindrical hard surfacing sleeve.

4. The apparatus of claim 1 wherein the hard surfacing material surrounds the outer surface of the heat exchange tube to form a substantially cylindrical hard surfacing sleeve having a thickness of from about 1 mm to about 5 mm.

5. The apparatus of claim 1 wherein the hard surfacing material surrounds the outer surface of the heat exchange tube to form a substantially cylindrical hard surfacing sleeve having a thickness of from about 2 mm to about 4 mm.

6. The apparatus of claim 1 wherein the hard surfacing material surrounds the outer surface of the heat exchange tube to form a substantially cylindrical hard surfacing sleeve having a length of from about 200 mm to about 500 mm.

7. The apparatus of claim 1 wherein the hard surfacing material surrounds the outer surface of the heat exchange tube to form a substantially cylindrical hard surfacing sleeve having a length of from about 300 mm to about 400 mm.

8. The apparatus of claim 1 wherein:
the heat exchange tube has a proximal portion, a protected portion, and a distal portion; and
the hard surfacing material surrounds the outer surface of the protected portion of the heat exchange tube, wherein the outer surface of the proximal portion and the distal portion of the heat exchange tube is in contact with the catalyst.

9. The apparatus of claim 1 wherein:
the vessel defines a chamber;
the heat exchange tube has a proximal portion, a protected portion, and a distal portion, wherein the proximal portion, the protected portion, and the distal portion are positioned in the chamber; and
the hard surfacing material surrounds the outer surface of the protected portion of the heat exchange tube, wherein the outer surface of the proximal portion and the distal portion of the heat exchange tube is in contact with the catalyst.

10. The apparatus of claim 1 wherein the gas distributor lance and the heat exchange tube are substantially parallel.

11. The apparatus of claim 1 wherein the gas outlet of the gas distributor lance is separated from the heat exchange tube by a distance of from about 50 mm to about 200 mm.

12. The apparatus of claim 1 wherein the gas outlet of the gas distributor lance is separated from the heat exchange tube by a distance of from about 80 mm to about 120 mm.

13. An apparatus for processing catalyst, the apparatus comprising:
a regeneration vessel configured to receive spent catalyst and to regenerate the spent catalyst to form regenerated catalyst; and
a catalyst cooler in fluid communication with the regeneration vessel for receiving the catalyst therefrom, wherein the catalyst cooler includes a heat exchange tube having an outer surface and a hard surfacing material located on the outer surface of the heat exchange tube, wherein the hard surfacing material surrounds the outer surface of the heat exchange tube to form a cylindrical hard surfacing sleeve.

14. The apparatus of claim 13 wherein the catalyst cooler includes a gas distributor lance having a gas outlet configured for injecting gas into the catalyst.

15. The apparatus of claim 14 wherein the hard surfacing material is located on the outer surface of the heat exchange tube adjacent the gas outlet of the gas distributor lance.

16. The apparatus of claim 13 wherein the hard surfacing material surrounds the outer surface of the heat exchange tube to form a substantially cylindrical hard surfacing sleeve having a thickness of from about 1 mm to about 5 mm.

17. The apparatus of claim 16 wherein the substantially cylindrical hard surfacing sleeve has a length of from about 200 mm to about 500 mm.

18. The apparatus of claim 13 wherein:
the catalyst cooler includes a vessel defining a chamber;
the heat exchange tube has a proximal portion, a protected portion, and a distal portion, wherein the proximal portion, the protected portion, and the distal portion are positioned in the chamber; and
the hard surfacing material surrounds and is welded to the outer surface of the protected portion of the heat exchange tube, wherein the outer surface of the proximal portion and the distal portion of the heat exchange tube is in contact with the catalyst.

19. A method for cooling catalyst, the method comprising the steps of:
delivering the catalyst into a catalyst cooler vessel;
transferring heat from the catalyst to a heat exchange tube positioned in the catalyst cooler vessel, wherein the heat exchange tube has an outer surface;
injecting gas into the catalyst within the catalyst cooler vessel to cause back-mixing of the catalyst; and
preventing impingement of the outer surface of the heat exchange tube by the gas with a hard surfacing material located on and welded to the outer surface of the heat exchange tube.

\* \* \* \* \*